Oct. 19, 1937.  J. H. KORTERING  2,096,282
FIFTH WHEEL CONSTRUCTION
Filed Dec. 23, 1935  2 Sheets-Sheet 1
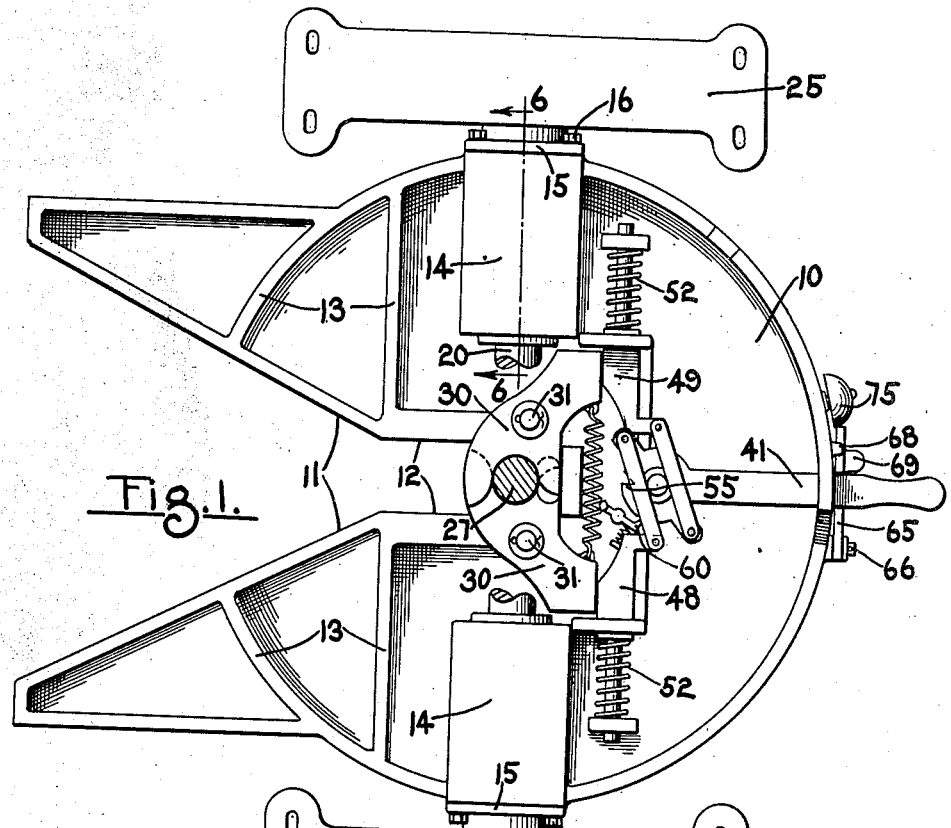
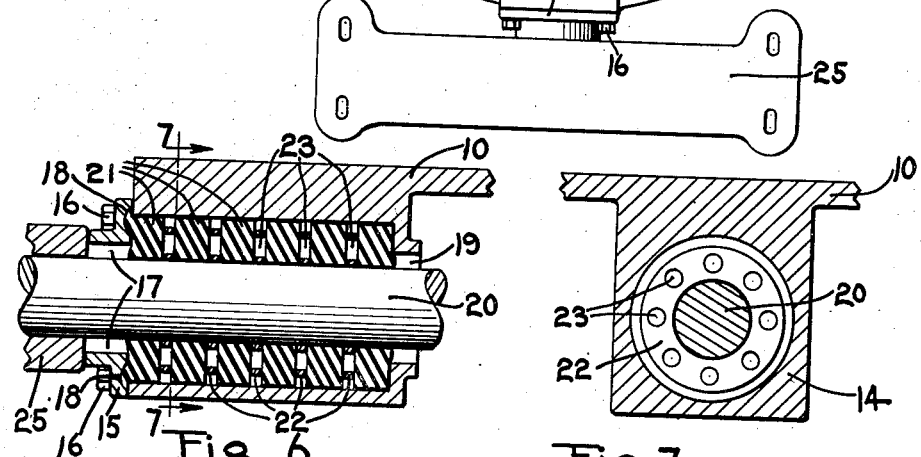
Inventor
Justin H. Kortering Oct. 19, 1937.    J. H. KORTERING    2,096,282
FIFTH WHEEL CONSTRUCTION
Filed Dec. 23, 1935    2 Sheets-Sheet 2
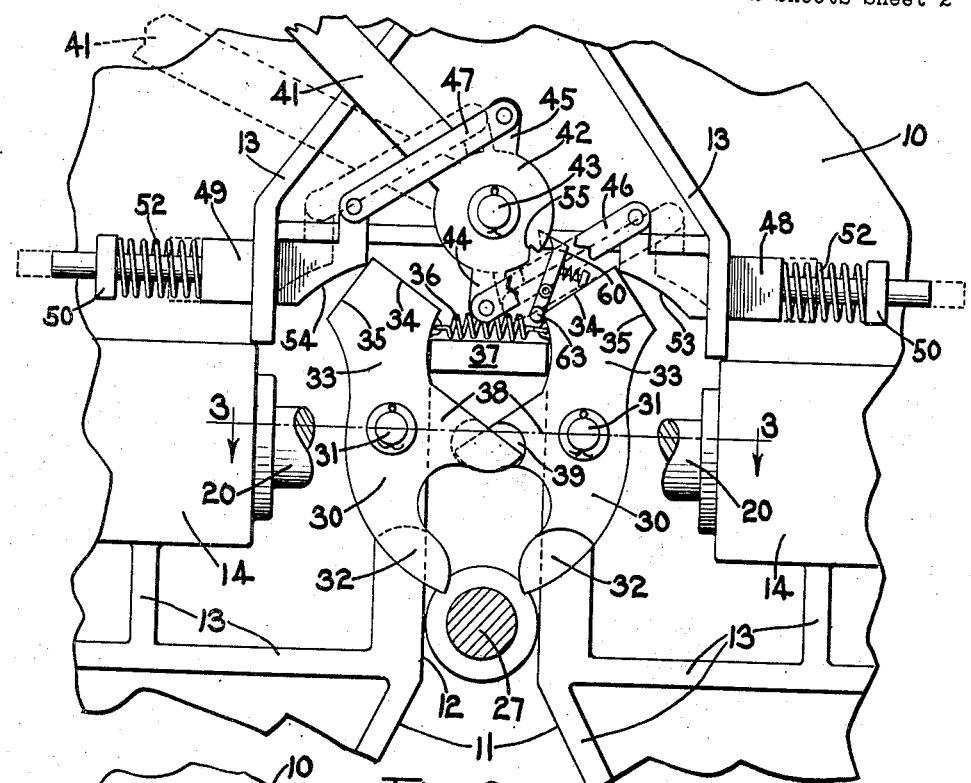
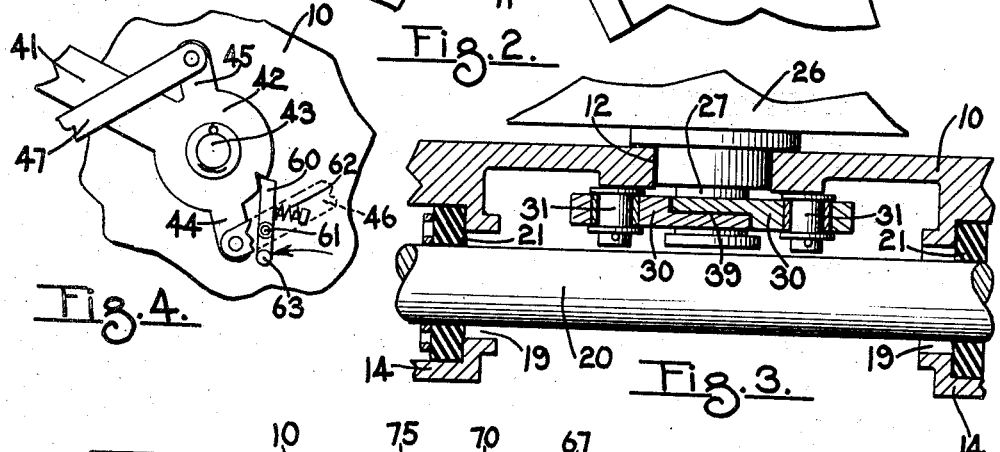
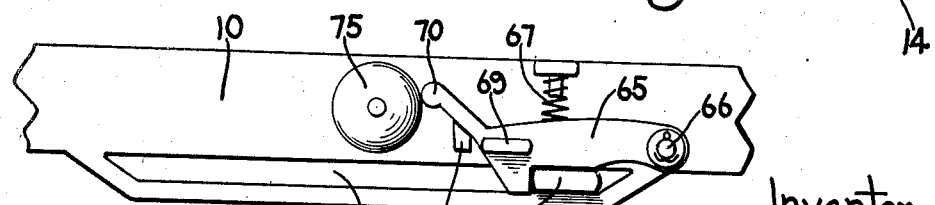
Inventor
Justin H. Kortering
Attorneys Patented Oct. 19, 1937

2,096,282

UNITED STATES PATENT OFFICE 2,096,282

FIFTH WHEEL CONSTRUCTION

Justin H. Kortering, Holland, Mich.

Application December 23, 1935, Serial No. 55,822

13 Claims. (Cl. 280—33.1)

This invention relates generally to a coupling unit or device and more particularly to a fifth wheel adapted to be inserted between a pulling unit, as, for instance, a truck and a pulled unit, as, for instance a trailer or a semi-trailer.

Considerable difficulty has been experienced in obtaining the proper connection between units of this character inasmuch as a certain amount of yielding therebetween is necessary in order that the vehicles may follow the road contour, but yet be securely and safely connected together.

The fact that yielding must occur between the vehicles causes heavy strains between the units, especially after some wear occurs, and consequently the fifth wheel which is used must be very strong and very positive in its action. Furthermore, it must be so constructed as to eliminate any accidental release.

Thus, it is one aim of my invention to produce a coupling unit or fifth wheel which will not only serve in accomplishing both of the above mentioned functions but also the unit is economical to manufacture.

One feature of my invention resides in the automatic operation of the fifth wheel coupling. This automatic operation occurs after the movement of the releasing lever to a position permitting movement of the locking jaws. The jaws, now unlocked, separate during the outward or releasing movement of the king pin, due to spring tension therebetween. Locking mechanism now holds the jaws of the device in wide open position until the king pin is again inserted therebetween whereupon this forcible movement automatically closes the jaws and the automatic locking means retains the jaws positively closed until the releasing lever is again operated.

Another feature of my invention is the novel signalling means which operates after the locking latch itself is in fully locked position upon the releasing lever.

Another feature resides in my construction whereby the king pin is prevented from withdrawal movement even though one of the jaw members becomes completely inoperative. In other words, my device would operate even though the king pin holding part of one of the jaws was removed.

Other advantages and meritorious features will become apparent and understood as the specific description of this embodiment of this invention is described.

In the drawings:

Fig. 1 is an underplan view of my invention as applied to the lower plate of the fifth wheel, the several parts being in locked position whereby the king pin is revolubly retained therein.

Fig. 2 is a fragmentary enlarged view showing the coupling mechanism in unlocked position.

Fig. 3 is a sectional view taken along the line 3—3 of Fig. 2.

Fig. 4 is a fragmentary view showing the pivotal mounting of the manually actuated releasing lever.

Fig. 5 is a fragmentary view looking toward the end of the releasing lever.

Fig. 6 is a sectional view taken along the line 6—6 of Fig. 1.

Fig. 7 is a sectional view taken along the line 7—7 of Fig. 6.

Like numerals refer to like parts throughout the several views.

Referring to the drawings, numeral 10 indicates the fifth wheel plate which has tapered sides 11 merging into the king pin releasing slot 12. Reinforcing ribs 13 of proper size and shape, as shown, are placed at the underside of the plate 10.

As shown in Figs. 6 and 7 integrally formed depending housings 14 are formed at opposite sides of the plate 10, see Figs. 1 and 2, and have open outer ends which are closed by plates 15 held on by studs 16. The plates 15 have an opening 17 as shown through which a supporting shaft 20 passes. Also, the opposite ends of the housings 14 have openings 19 through which the shaft 20 passes. The interior of each of the housings 14 is of cylindrical shape and receives rubber disks 21 and metal disks 22 therein. Holes 23 are formed in the metal disks 22. Also, both of the openings 17 and 19 are of greater size than the supporting shaft 20. Thus, the shaft 20 may bodily move relatively to the fifth wheel plate 10. During this movement the rubber disks 21 are distorted and compressed into the adjacent holes and spaces of the metal disks 22.

As will be understood by those skilled in this art the shaft 20 is carried by brackets 25, see Fig. 1, and the fifth wheel 10 is pivotally mounted upon this shaft 20.

Referring now to Fig. 3, numeral 26 indicates the vehicle carrying the king pin 27, this king pin being movable to and from the slot 12. The king pin 27 is locked in the slot by a mechanism now to be described.

As shown in Figs. 1 and 2, opposing jaws 30 are pivotally mounted onto the plate 10 adjacent opposite sides of the slot 12 as indicated at 31. The front ends 32 of these jaws are cut away so as to overlap whenever the jaws are closed and the king pin encircled. Thus the king pin is securely held in locked position. The rear portions 33 of each of these jaws have cam surfaces 34 and 35 formed thereon, these surfaces being angularly positioned with respect to each other.

A tension spring 36 connects between the rear portions of these jaws and tends to pull them against the stop 37. Thus the parts 32 of the jaws are in wide open position ready to receive the king pin. See Fig. 2.

Intermediate the ends of the jaws, extensions 38 are formed and these extensions are recessed, respectively as 39 whereby the jaws overlap. Furthermore, the extensions and their respective recesses are so formed as to cause the jaws to move together.

As shown in Figs. 1 and 5, the arcuate outermost rib of the plate 10 is slotted at 40 to receive the end of the manual releasing lever 41 which is enlarged at 42 about its pivot 43 and has opposed extensions 44 and 45 which are pivotally connected by the links 46 and 47 onto the reciprocating members or blocks 48 and 49.

The members or blocks 48 and 49 are slidably mounted in openings extending through certain of the ribs 13 and alined openings in lugs 50. These lugs 50 are integral with the plate 10, and receive the reduced ends of the members 48 and 49 therein. Springs 52 are positioned between the lugs 50 and the adjacent reciprocating member whereby these members are urged inwardly.

The inner end of the member 48 is arcuately cut away at 53, this curved surface being more or less concentrically formed about the pivot point 31. Member 49 has a similarly formed surface 54.

The enlarged pivoted end 42 of the releasing lever has a notch 55 formed therein whereby a trip or pawl lever 60, pivoted at 61 onto the plate 10, is urged toward the disk 42, and into engagement with the notch 55 by means of the spring 62. The opposite end of the trip 60 has a projection 63 located in the same plane as the adjacent jaw member 30. See Figs. 2 and 4.

The manual releasing lever 41, previously referred to, has a locking means consisting of a locking catch or latch 65 pivoted at 66 and spring urged to operative position by means of the spring 67 acting against the latch 65. The stop 68 limits the movement of the latch 65. An extension 69 provides means whereby this locked member may be lifted. Also, a striker 70 is so located as to engage the bell 75 upon movement of the locking means 65 to operative position.

The operation

The several parts are positioned as shown in Fig. 1 when the device is in an operative position, that is, whenever the tractor unit is pulling the trailer unit. The king pin 27 is engaged between the jaws 30 and any lateral movement between these two vehicles is taken care of by the resilient means, see Figs. 6 and 7, this resilient means being between the shaft 20 and the fifth wheel plate 10.

After the driver has reached his destination, he raises the locking latch 65 by means of the finger lug 69 and then moves the lever 41 to the position indicated by dotted lines in Fig. 2. This same position is shown in full lines in Fig. 4 and the attainment of this position causes the pawl lever 60 to enter the notch 55 in the disk 42. Thus the lever is held as shown in Fig. 4.

The movement of the lever 41 as just explained simultaneously turns the extensions 44 and 45 and this movement causes an outward movement of the reciprocating members 48 and 49 through the links 46 and 47 to the dotted line position shown in Fig. 2. This movement carries those flat surfaces on the members 48 and 49 which oppose the flat surfaces 34 on the jaws outwardly with respect thereto and thus the jaws are free to move. However, the king pin is positioned immediately against the extensions 38 of the jaws 30 and thus the jaws remain in locked position. However, as soon as the driver moves the tractor unit forwardly the spring 36 causes the jaws to move toward and to the position shown in Fig. 2. Just before they reach this position, the tripping of the pawl lever 60 occurs by engagement of one of the jaws against the lug 63. See Fig. 4.

This causes release of the lever 60 from the notch 55 and immediately the springs 52 become effective to position the reciprocating members 48 and 49 inwardly against the surfaces 35 as clearly shown in Fig. 2. The stop 37 limits this opening movement of the jaws.

The jaws are now in open position and ready to receive the king pin of the pulled unit, probably carrying a new load of merchandise therein. The king pin enters between the jaws 30 and forcibly abuts the extensions 38 and turns the jaws and thus moves the surfaces 35 at the rear portions of the jaws against the reciprocating members 48 and 49, incidentally tensioning the springs 52, and the completion of this movement permits the members 48 and 49 to slide inwardly to lock the jaws in place. This locking occurs by means of engagement between the flat sides of the reciprocating blocks and the surfaces 34 on the jaws. See Fig. 1.

During the inward movement of the reciprocating members 48 and 49, the lever 41 also simultaneously moves and this lever cams against the angularly located edge of the locking latch 65 and thus raises the same until the releasing lever 41 is in the position shown in Fig. 1. The reciprocating members 48 and 49 are positioned as shown in Fig. 1 and thus the jaws are positively locked in position. When the lever is positioned as shown in Fig. 1 the locking latch 65 drops and is urged downwardly by a spring 67 causing the striker 70 to hit the bell 75 and gives the driver an audible signal that the load is securely attached and that the releasing lever is also securely locked in position.

The above described a cycle of operations and shows that it is merely necessary for the driver to release the king pin by one operation whereupon the cycle of events above enumerated automatically follow.

It is to be understood that the rubber and metal disks, adapted for insertion into their respective housings, are of greater length than the housings. For instance, the length of the housing may be seven inches and the length of the disk, one-half inch or an inch greater and thus the head 15 is placed in position under pressure exerted by the studs 16. The head 15 is grooved as shown in Fig. 6, in order to prevent the surplus of rubber of adjacent rubber disk 21 from entering between the head 15 and the end of the casing.

In operation, the head 15, see Figs. 1 and 6, bears against the adjacent supporting standards 25 and thus the fifth wheel plate 10 is held against lateral or sidewise shifting movement. This is possible in my construction inasmuch as the relative positioning of the king pin 27 and the adjacent pivots 31, being substantially in line laterally as shown in Fig. 1, having sufficient strength to resist initially any tendency toward lateral movement. Thus the lateral movement of the king pin exerts forces which are carried directly by the pivots 31 with practically no turning movement and therefore it is not necessary to cushion the lateral forces between the king pin and the tractor unit.

The stop 37 carries direct forward or overrunning movement of the pulled unit through the extensions 38, these being under only compressive stress and thus an exceedingly sturdy construction in this regard is had.

Yet another feature present in my invention resides in the relatively long bearing length between the cross shaft 20 and the casing carrying the series of disks whereby an appreciably greater factor of safety is obtained. This construction is permissible on account of the particular jaw construction which is such as to permit these relatively long bearing surfaces.

The nature and scope of the invention are set forth in the above specification, taken with the drawings, showing the construction in which the principle of my invention is embodied; and the novel features thereof are specified in the appended claims. But this disclosure is explanatory only and I may in practice vary the structural details actually shown, without departing from the spirit of the invention, to the full extent indicated by the broad and general meaning of the terms in which the appended claims are expressed.

I claim:

1. A fifth wheel construction comprising a first means movable to encircle a king pin, locking means slidable to and from engagement with said first means whereby the same is locked or released, a third means manually operable to withdraw the locking means for engaging position, a pawl associated with the third means to hold the same in its withdrawn position and a fifth means acting upon the pawl to release the same, said first means acting upon the fifth means when the king pin is substantially released from the said first means.

2. A fifth wheel construction as set forth in claim 1 in which said third means has a latch therefor to hold it in a position wherein the locking means is in engaging position, said latch having a cam surface engageable by the third means moving to its locked position to cause movement of the latch to holding position.

3. A fifth wheel construction comprising, a plate having a slot into which a king pin is adapted to move, two jaws, one jaw being pivoted near one side of said slot and the other jaw pivoted at the other side of said slot, said jaws having means on one side of their pivots to engage the king pin and having spaced apart surfaces at the opposite sides of their pivots, sliding means adjacent each jaw, said sliding means contacting said surfaces on the jaws to hold them in a locked position, spring means for urging the sliding means to locked position, means for opening the jaws to receive the king pin, lever means for moving the sliding means to a wide open position against the action of the said spring means whereby the said sliding means are free from the said jaws, automatic locking means for holding the lever means and the sliding means in wide open position, said automatic locking means being released by opening movement of the said jaws to permit a limited expansive movement of the said spring means whereby the sliding means engages the jaws to hold them in open position.

4. In combination, a fifth wheel plate adapted to receive a king pin, opposed jaws intermediately pivoted to engage the king pin at one end and having surfaces at right angles, approximately, at the other end, one pair of said surfaces being substantially in alinement when the jaws are in closed position, alined sliding means adapted to move in adjacent relationship to said alined surfaces to prevent opening of the jaws, means to move the said sliding means away from the jaws, latch means to hold said moving means in its released position, means on one of said jaws adapted to contact with the latch means at a predetermined point to release the same, said sliding means contacting the second mentioned surfaces on the said jaws when the said release occurs, to hold the jaws in their open position.

5. A combination of elements as recited in claim 4 in which an extension is formed on one jaw, said extension being engageable by entry of the king pin whereby release of the sliding means from the second mentioned surfaces on the said jaws occurs.

6. A construction of the class described comprising a pair of jaws adapted to receive a king pin, said jaws being movable to open and closed positions, means for locking said jaws in closed position, manual means, having a shoulder therein, for moving said locking means to an unlocked position out of the path of movement of said jaws, yieldable means acting to move said locking means to locking position, a latch abutting the shoulder of said manual means and acting to retain said locking means in unlocked position, said latch being slid laterally from the shoulder by movement of said jaws to open position.

7. A construction of the class described comprising a jaw cooperatively associated with a king pin, said jaw being movable to open or closed position, means for locking said jaw in closed position, manual means for moving said locking means out of the path of movement of the said jaw, yieldable means acting to move said locking means to locking position, a latch associated with the manual means and locking means to maintain the locking means in retracted position and means, operated by opening movement of the jaw, for tripping said latch to immediately permit said locking means to enter the path of said jaw, said jaw having a cam surface thereon contacted by the said locking means, the shape thereof being such that the jaw is urged to its open position.

8. A fifth wheel construction comprising, a plate having a slot into which a king pin is adapted to move, a jaw member pivoted intermediate its ends upon the said plate, said jaw member having one end movable from an encircling position relative to the said king pin to an unlocked position in which said king pin may be withdrawn from the said slot, said jaw member having, on its other end, a surface extending at right angles, substantially, to the path of movement of the king pin along said slot, locking means slidable to and from facing contact with the said surface, spring means for urging the locking means to contacting position, means for moving said locking means out of contact with the said surface, a latch cooperatively associated with the locking means to hold it in its retracted position, said jaw member contacting said latch to release the same when the jaw member is moved to an unlocked position, stop means adjacent said jaw member to limit its movement from encircling position, said jaw member having a portion extending in the sliding path of the locking means when turned to its unlocked position, said locking means contacting the jaw member as aforesaid to maintain it in unlocked position.

9. A combination of elements as set forth in claim 6 in which one of the jaws is cam shaped as to contact the king pin during a portion of its outward movement whereby the latch is positively slid from said shoulder.

10. A combination of elements as set forth in claim 6 in which one of the jaws is cam shaped as to contact the king pin during a portion of its outward movement whereby the latch is positively slid from said shoulder and yieldable means attached to the jaws to tend to open them whereby the latch may be released.

11. A combination of elements as set forth in claim 6 in which means is provided for holding the jaws in wide open position, said means including the aforesaid yieldable means and providing for compressing thereof prior to release of the said holding means.

12. A fifth wheel construction comprising a plate having a slot into which a king pin is adapted to move, two jaws, one jaw being intermediately pivoted near one side of said slot and the other jaw intermediately pivoted at the other side of said slot, said jaws being swingable to overlapping relationship, the adjacent ends of the jaws being recessed to receive the said king pin therebetween, said pivots being spaced sufficiently to permit the king pin to be located substantially in the said straight line therewith when the jaws are moved to their closed position, said jaws having flat back surfaces which are in alined position when the jaws are swung to their closed position, a member having a straight surface against which the aforesaid alined jaw surfaces bear when the jaws are swung to their closed position and locking means for holding the jaws in their closed position.

13. A combination of elements as set forth in claim 12 in which the said locking means comprises second surfaces on the jaws at the ends opposite to the recessed king pin receiving ends, said surfaces being alined when the jaws are in closed position, an abutment spaced from each of the said second surfaces and means adapted to be interposed between said abutments and the said surfaces.

JUSTIN H. KORTERING.